US008474672B1

(12) United States Patent
Keith

(10) Patent No.: US 8,474,672 B1
(45) Date of Patent: Jul. 2, 2013

(54) HIKER'S BUDDY APPARATUS FOR SHARING WITH A HIKER THE CARRYING LOAD OF A BACKPACK

(76) Inventor: Michael R. Keith, Seminole, OK (US)

( * ) Notice: Subject to any disclaimer, the term of this patent is extended or adjusted under 35 U.S.C. 154(b) by 192 days.

(21) Appl. No.: 13/065,726

(22) Filed: Mar. 29, 2011

(51) Int. Cl.
A63B 71/00 (2006.01)

(52) U.S. Cl.
USPC .......................................... 224/576; 224/637

(58) Field of Classification Search
USPC ............. 224/576, 637; 601/5, 34–35; 623/32, 623/41, 42; 482/51, 66, 70, 75; 248/161, 248/404, 407, 408
See application file for complete search history.

(56) References Cited

U.S. PATENT DOCUMENTS

| | | | |
|---|---|---|---|
| 4,194,656 A | 3/1980 | Zufich | |
| 4,557,257 A | 12/1985 | Fernandez et al. | |
| 4,858,797 A * | 8/1989 | Rabska | 224/162 |
| 5,405,409 A | 4/1995 | Knoth | |
| 5,586,699 A | 12/1996 | Heisler et al. | |
| 5,642,846 A | 7/1997 | Morrow | |
| 5,948,021 A | 9/1999 | Radcliffe | |
| 6,364,186 B1 | 4/2002 | Gilmour et al. | |
| 6,619,523 B1 | 9/2003 | Duckworth | |
| 6,666,796 B1 * | 12/2003 | MacCready, Jr. | 482/51 |
| 7,021,508 B1 * | 4/2006 | Aston | 224/628 |
| 7,571,839 B2 * | 8/2009 | Chu et al. | 224/637 |
| 2006/0240960 A1 * | 10/2006 | Shahinpoor | 482/121 |
| 2007/0056592 A1 * | 3/2007 | Angold et al. | 128/845 |
| 2007/0123997 A1 * | 5/2007 | Herr et al. | 623/27 |

* cited by examiner

Primary Examiner — Adam Waggenspack
(74) Attorney, Agent, or Firm — Richard L. Miller

(57) ABSTRACT

An arrangement for replaceably supporting a backpack having a load on the back of a user and transferring the load of the backpack to the ground by way of the legs of the user while allowing the user to take steps unhindered. The arrangement includes a harness and a leg assembly. The harness replaceably supports the backpack having the load on the back of the user. The leg assembly is pivotally mounted to the harness, extends down the legs of the user, and transfers the load of the backpack to the ground by way of the legs of the user while allowing the user to take the steps unhindered.

33 Claims, 7 Drawing Sheets

U.S. Patent  Jul. 2, 2013  Sheet 1 of 7  US 8,474,672 B1
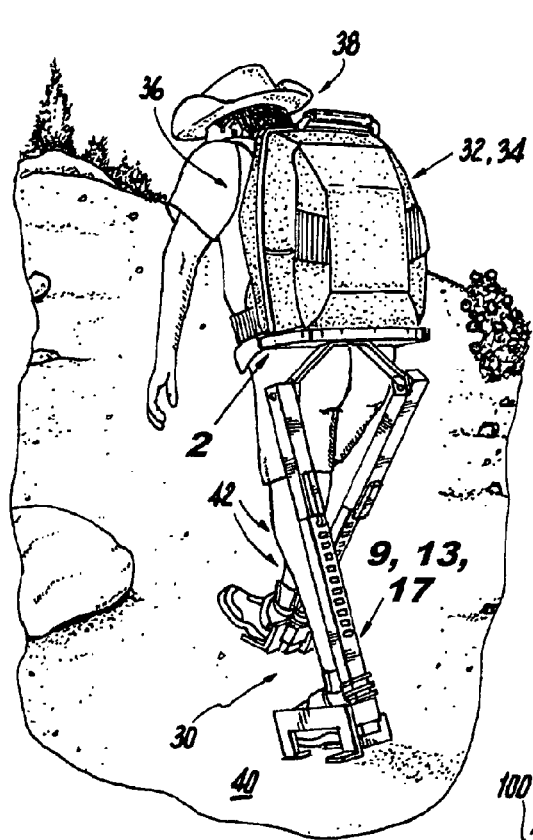
Fig. 1
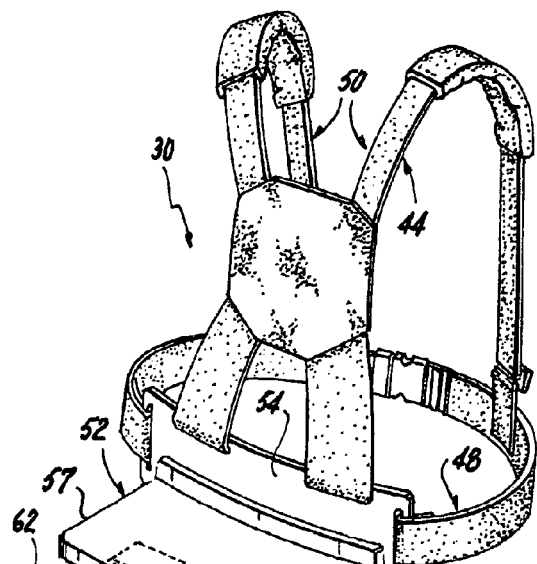
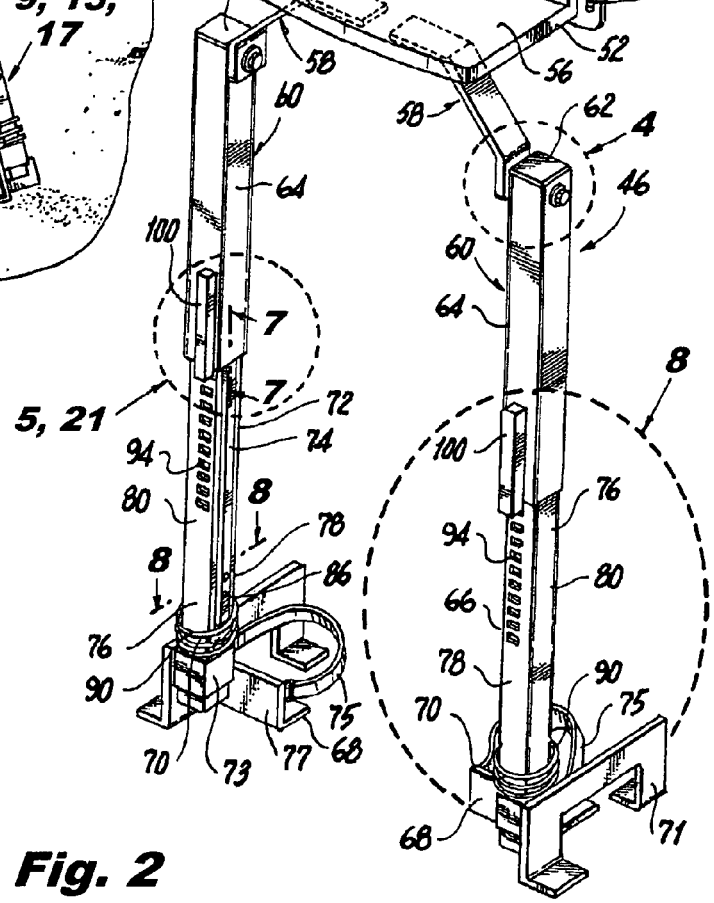
Fig. 2

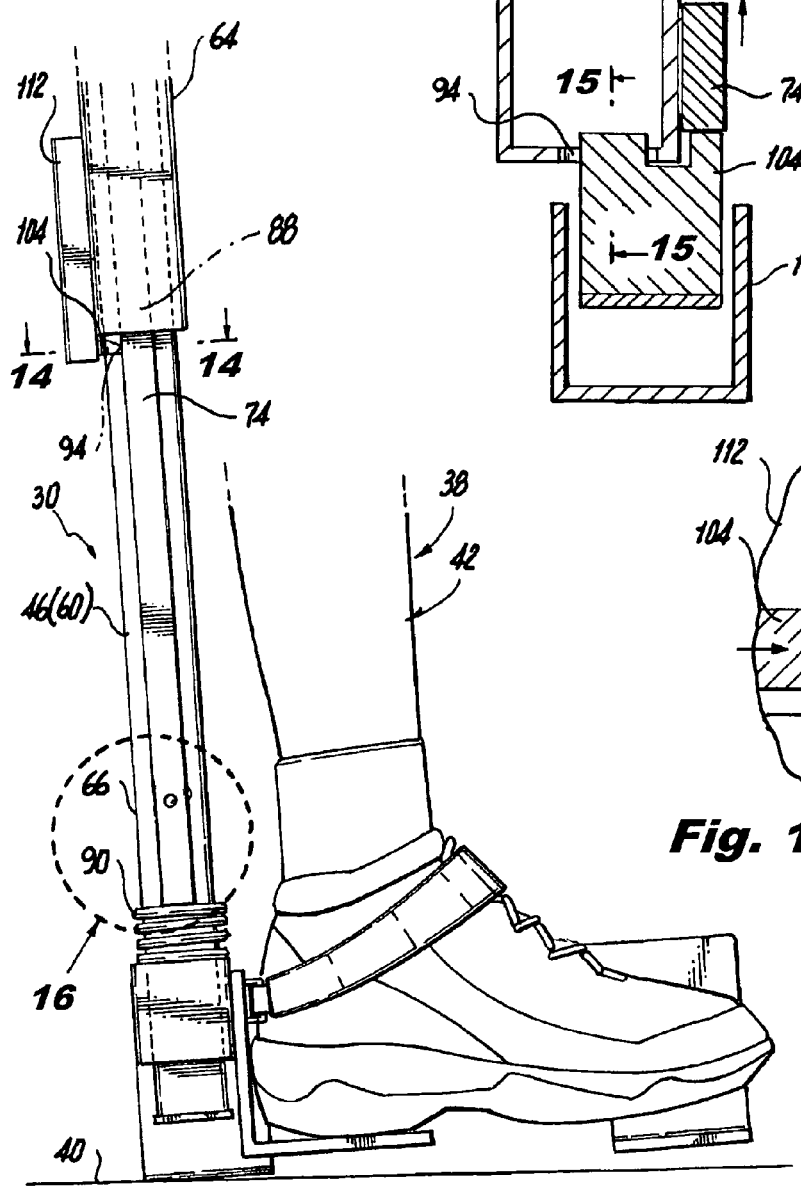
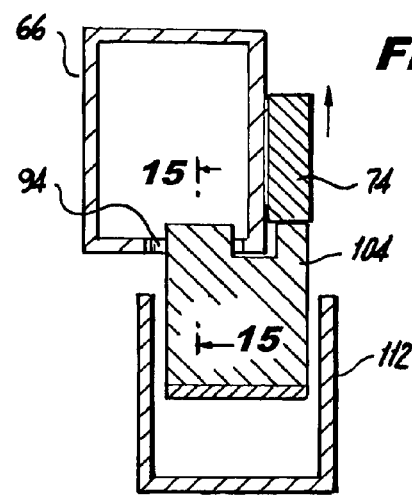
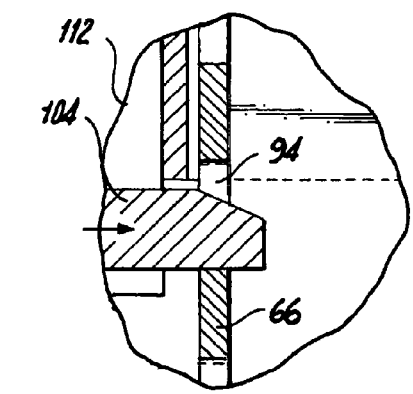
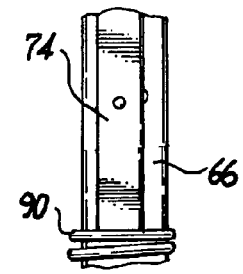

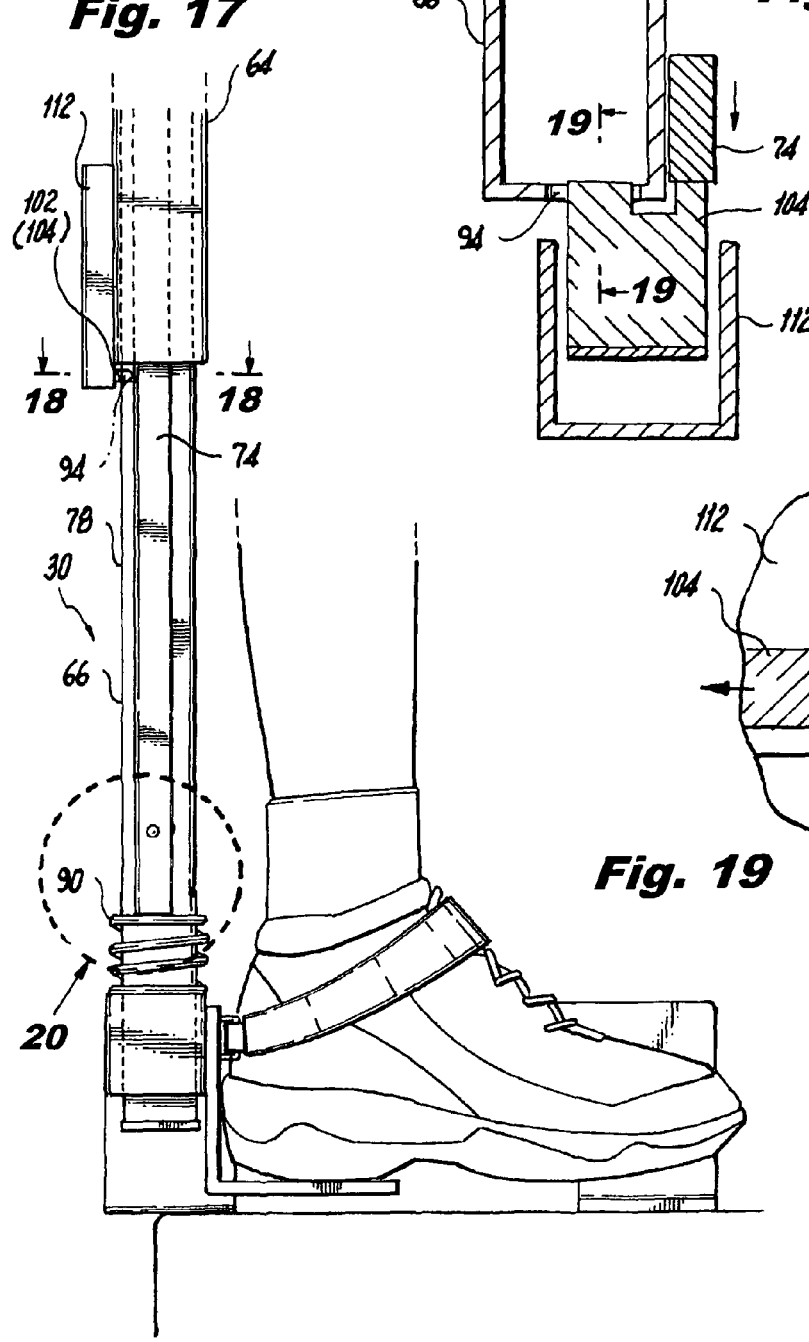

HIKER'S BUDDY APPARATUS FOR SHARING WITH A HIKER THE CARRYING LOAD OF A BACKPACK

1. BACKGROUND OF THE INVENTION

A. Field of the Invention

The embodiments of the present invention relate to an arrangement for replaceably supporting a backpack having a load on the back of a user, and more particularly, the embodiments of the present invention relate to an arrangement for replaceably supporting a backpack having a load on the back of a user and transferring the load of the backpack to the ground by way of the legs of the user while allowing the user to take steps unhindered.

B. Description of the Prior Art

Numerous innovations for backpack supports or leg supports have been provided in the prior art, which will be described below in chronological order to show advancement in the art, and which are incorporated herein by reference thereto. Even though these innovations may be suitable for the specific individual purposes to which they address, however, they differ from the present invention in that they do not teach an arrangement for replaceably supporting a backpack having a load on the back of a user and transferring the load of the backpack to the ground by way of the legs of the user while allowing the user to take steps unhindered.

(1) U.S. Pat. No. 4,194,656 to Zufich.

U.S. Pat. No. 4,194,656 issued to Zufich on Mar. 25, 1980 in U.S. class 224 and subclass 631 teaches a backpack and frame apparatus including a pair of tubular side bars and lateral cross members for supporting the backpack and upper terminus of the shoulder harness. A supporting belt adapted to be coupled about the user's waist and hips includes downwardly projecting panels disposed on diametrically opposed sides of the belt and adapted to lie substantially below the waist of the user. A supporting frame is coupled to the lower extensions of the belt and extends about the rear of the user. The support frame is reciprocally coupled to a pack frame cross member to provide independent movement between the pack frame and the support frame.

(2) U.S. Pat. No. 4,557,257 to Fernandez et al.

U.S. Pat. No. 4,557,257 issued to Fernandez et al. on Dec. 10, 1985 in U.S. class 602 and subclass 5 teaches an apparatus and operating system to be used by a paraplegic or other crippled person, which has a patient-supporting walker, braces extending entirely along the user's legs, a body-supported pneumatic system for alternately moving the legs in a pre-determined manner, and user-operated control apparatus for operating the system.

(3) U.S. Pat. No. 5,405,409 to Knoth.

U.S. Pat. No. 5,405,409 issued to Knoth on Apr. 11, 1995 in U.S. class 623 and subclass 44 teaches a prosthetic leg that has a pivotal knee joint and a hydraulic fluid control unit connected to provide variable forces that dampen flexion and extension of the knee and also bias the leg to its extended position. The unit includes an aluminum housing lined with an axially adjustable sleeve and a control bushing defines a cylindrical operating chamber that receives a piston mounted on a tubular piston rod. The housing and operating chamber receive hydraulic fluid or oil that flows during movement of the piston through fluid control ports, channels, and adjustable gaps defined by the sleeve and bushing for damping the movement of the rod. The piston rod encloses a gas-filled flexible bladder that forms an oil accumulator during inward movement of the piston rod into a displacement chamber and also produces variable forces for moving the piston rod outwardly to its extended position. An annular seal engages an inner portion of the piston rod and prevents the higher hydraulic pressure in the displacement chamber from transferring to the operating chamber and the annular seal between the housing and the outer portion of the piston rod.

(4) U.S. Pat. No. 5,586,699 to Heisler et al.

U.S. Pat. No. 5,586,699 issued to Heisler et al. on Dec. 24, 1996 in U.S. class 224 and subclass 628 teaches a rectangular frame for supporting a backpack having a pair of shoulder straps. The frame includes a pair of cross members and a pair of fittings for securing the shoulder straps to the frame. The fittings include a main section having a series of parallel slots, a semi-circular member at each end of the main section for securing the fittings to the cross members, and a slotted ring mounted on each shoulder strap. The ring is of a size to pass through the slots and rotatable with respect to the shoulder strap to lock the strap in the slots in the fitting.

(5) U.S. Pat. No. 5,642,846 to Morrow.

U.S. Pat. No. 5,642,846 issued to Morrow on Jul. 1, 1997 in U.S. class 224 and subclass 576 teaches a backpack support apparatus that includes first, second, and third poles, and first, second, and third couplings that removably couple the poles to a backpack frame to form a tripod-like support configuration. The couplings hold the poles so that the poles angle away from the backpack frame. In addition, the couplings hold the poles in a way enabling a user to remove the poles by lifting the backpack frame. The couplings may be part of the backpack frame, they may be attached to a backpack frame as original equipment, or they may be mounted as retrofit equipment on an existing backpack frame. The poles in one embodiment slide together to form a walking staff, and a separate hook attaches to the third pole to adapt it to use in mounting a bear bag over a tree limb.

(6) U.S. Pat. No. 5,948,021 to Radcliffe.

U.S. Pat. No. 5,948,021 issued to Radcliffe on Sep. 7, 1999 in U.S. class 623 and subclass 44 teaches an hydraulic cylinder control unit for gait control of a prosthetic limb, which features two cylindrical tubes that are eccentric with respect to each other. The inner tube houses hydraulic fluid and the gap between the two tubes serves as a displacement chamber as a piston, mounted on a piston rod, moves through the fluid in the inner tube. When the outer tube is rotated about the inner tube, the gap between the tubes changes, which either increases or decreases the flow allowed between the tubes. This changes the resistance that controls the rate of swing of an artificial limb. The resistance is adjustable by a simple rotation of the outer cylindrical tube. A floating sealed piston is additionally provided at the bottom of the inner tube. The sealed piston moves upwards or downwards depending on the balance of forces between the fluid force above the piston and the stored energy force below the sealed piston. The stored energy force can be either a spring or compressed gas and helps to return stored energy to the system and reduces the amount of energy required by the person in walking.

(7) U.S. Pat. No. 6,364,186 to Gilmour et al.

U.S. Pat. No. 6,364,186 issued to Gilmour et al. on Apr. 2, 2002 in U.S. class 224 and subclass 637 teaches a backpack or back borne load carrier system with abdominal support, providing both internal and external modes of back borne load support to increase an individual's load bearing capacity. An abdominal support pad and a pelvic belt system is attached to a conventional backpack or equivalent load carrier system equipped with shoulder straps to cause a portion of the load weight that would otherwise be supported directly by the shoulders and spinal column to be transferred to the pelvic region for additional external support and to the abdominal trunk region for additional internal support through enhancement of the natural hydraulic muscle action of the abdomen in support of the loaded spinal column.

(8) U.S. Pat. No. 6,619,523 to Duckworth.

U.S. Pat. No. 6,619,523 issued to Duckworth on Sep. 16, 2003 in U.S. class 224 and subclass 634 teaches a backpack including a frame, a pack shell, shoulder straps, and a waist strap. Connecting the pack shell to the frame of the backpack are one or more vibration dampers. Preferably, the vibration damper includes a cylindrical housing formed with a vertically extending bore aligned with the housing's central axis. A bore is configured for telescopic receipt of the side rails of the backpack frame. Located within the bore of the vibration damper is a spring that attenuates movement between the vibration damper's housing and a collar that radially projects from a portion of the frame's side rails. Preferably, the vibration damper includes an adjustable air valve for selectively controlling air to enter into and out of the chamber formed within the center of the vibration damper.

It is apparent that numerous innovations for backpack supports or leg supports have been provided in the prior art that are adapted to be used. Furthermore, even though these innovations may be suitable for the specific individual purposes to which they address, however, they would not be suitable for the purposes of the embodiments of the present invention as heretofore described, namely, an arrangement for replaceably supporting a backpack having a load on the back of a user and transferring the load of the backpack to the ground by way of the legs of the user while allowing the user to take steps unhindered.

2. SUMMARY OF THE INVENTION

Thus, an object of the embodiments of the present invention is to provide an arrangement for replaceably supporting a backpack having a load on the back of a user and transferring the load of the backpack to the ground by way of the legs of the user while allowing the user to take steps unhindered, which avoids the disadvantages of the prior art.

Briefly stated, another object of the embodiments of the present invention is to provide an arrangement for replaceably supporting a backpack having a load on the back of a user and transferring the load of the backpack to the ground by way of the legs of the user while allowing the user to take steps unhindered. The arrangement includes a harness and a leg assembly. The harness replaceably supports the backpack having the load on the back of the user. The leg assembly is pivotally mounted to the harness, extends down the legs of the user, and transfers the load of the backpack to the ground by way of the legs of the user while allowing the user to take the steps unhindered.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawing.

3. BRIEF DESCRIPTION OF THE FIGURES OF THE DRAWING

The figures of the drawing are briefly described as follows:

FIG. 1 is a diagrammatic perspective view of the arrangement of the embodiments of the present invention replaceably supporting a backpack having a load on the back of a user and transferring the load of the backpack to the ground by way of the legs of the user while allowing the user to take steps unhindered;

FIG. 2 is an enlarged diagrammatic perspective view of the arrangement of the embodiments of the present invention identified by ARROW 2 in FIG. 1;

FIG. 13 is an enlarged diagrammatic side elevational view of the leg of the leg assembly identified by ARROW 13 in FIG. 1 wherein the spring catch of the knee of the leg of the leg assembly of the arrangement of the embodiments of the present invention is latched;

FIG. 14 is an enlarged diagrammatic cross sectional view taken along LINE 14-14 in FIG. 13 of the spring catch of the knee of the leg of the leg assembly of the arrangement of the embodiments of the present invention latched;

FIG. 15 is a diagrammatic cross sectional view taken along LINE 15-15 in FIG. 14 of the spring catch of the knee of the leg of the leg assembly of the arrangement of the embodiments of the present invention latched;

FIG. 16 is a diagrammatic side elevational view of the area generally enclosed by the dotted curve identified by ARROW 16 in FIG. 13 of the ankle spring fully compressed against the slot slide bar;

FIG. 17 is an enlarged diagrammatic side elevational view of the leg of the leg assembly identified by ARROW 17 in FIG. 1 wherein the spring catch of the knee of the leg of the leg assembly of the arrangement of the embodiments of the present invention is in the process of being unlatched;

FIG. 18 is an enlarged diagrammatic cross sectional view taken along LINE 18-18 in FIG. 17 of the spring catch of the knee of the leg of the leg assembly of the arrangement of the embodiments of the present invention being unlatched;

FIG. 19 is a diagrammatic cross sectional view taken along LINE 19-19 in FIG. 18 of the spring catch of the knee of the leg of the leg assembly of the arrangement of the embodiments of the present invention being unlatched;

FIG. 20 is a diagrammatic side elevational view of the area generally enclosed by the dotted curve identified by ARROW 20 in FIG. 17 of the ankle spring being extended against the slot slide bar;

Figure 21:
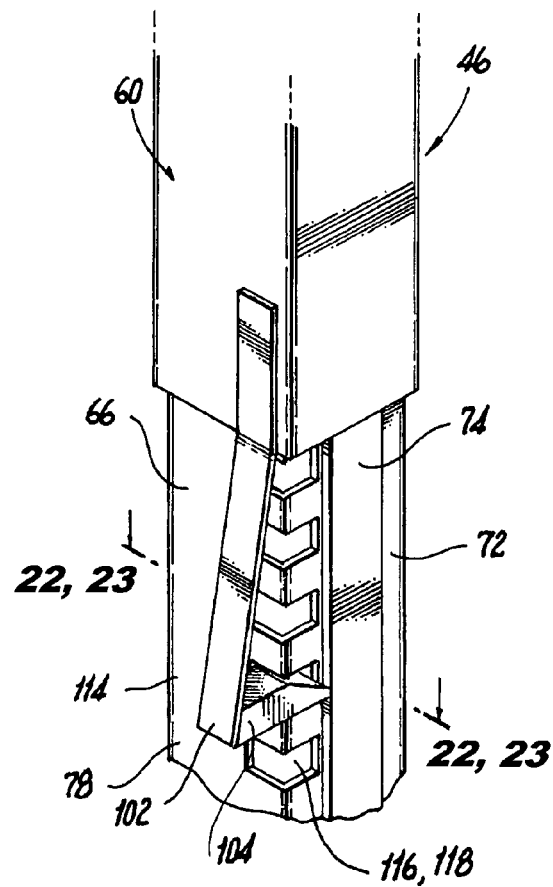
FIG. 21 is an enlarged diagrammatic perspective view of the area generally enclosed by the dotted curve identified by ARROW 21 in FIG. 2 of a second embodiment of the spring catch of the knee of the leg of the leg assembly of the arrangement of the embodiments of the present invention.
Figure 22:
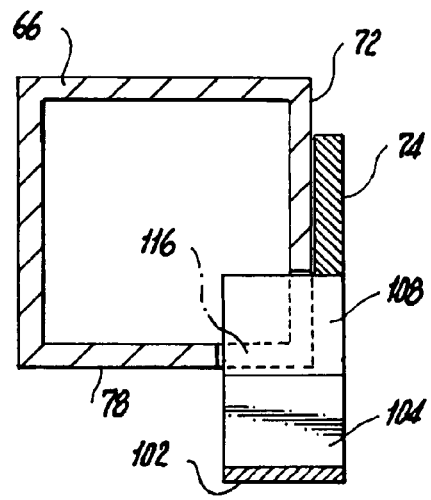
Figure 23:
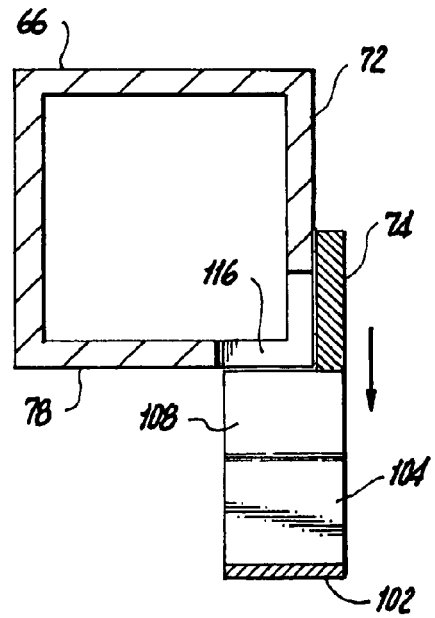

FIG. 22 is an enlarged diagrammatic cross sectional view taken along LINE 22-22 in FIG. 21 of the second embodiment of the spring catch of the knee of the leg of the leg assembly of the arrangement of the embodiments of the present invention latched; and FIG. 23 is an enlarged diagrammatic cross sectional view taken along LINE 23-23 in FIG. 21 of the second embodiment of the spring catch of the knee of the leg of the leg assembly of the arrangement of the embodiments of the present invention unlatched.

4. LIST OF REFERENCE NUMERALS UTILIZED IN THE FIGURES OF THE DRAWING

A. General.
30 arrangement of embodiments of present invention for replaceably supporting backpack 32 having load 34 on back 36 of user 38 and transferring load 34 of backpack 32 to ground 40 by way of legs 42 of user 38 while allowing user 38 to take steps unhindered
32 backpack
34 load of backpack 32
36 back of user 38
38 user
40 ground
42 legs of user 38
B. Overall Configuration of Arrangement 30.
44 harness for replaceably supporting backpack 32 having load 34 on back 36 of user 38
46 leg assembly for extending down legs 42 of user 38 and for transferring load 34 of backpack 32 to ground 40 by way of legs 42 of user 38 while allowing user 38 to take steps unhindered
C. Specific Configuration of Harness 44.
48 lap belt of harness 44 for replaceably encircling abdomen of user 38
50 pair of shoulder straps of harness 44 for replaceably engaging shoulders of user 38
52 shelf of harness 44 for supporting backpack 32 having load 34 thereof
54 upright portion of shelf 52 of harness 44
56 transverse portion of shelf 52 of harness 44 for supporting backpack 32 and load 34 thereof
57 pair of ends of transverse portion 56 of shelf 52 of harness 44
58 pair of pelvic bars of harness 44
D. Specific Configuration of Leg Assembly 46.
60 pair of legs of leg assembly 46 for running along back of legs 42 of user 38, respectively
62 pair of hip joints of leg assembly 46 for running along buttocks of user 38, respectively
64 upper femur portion of each leg of pair of legs 60 of leg assembly 46 for running along back of femur of associated leg 42 of user 38
66 lower tibia portion of each leg of pair of legs 60 of leg assembly 46 for running along back of tibia of associated leg 42 of user 38
68 foot of each leg of pair of legs 60 of leg assembly 46 for capturing foot of associated leg 42 of user 38
70 ankle joint of each leg of pair of legs 60 of leg assembly 46
71 base of foot 68 of each leg of pair of legs 60 of leg assembly 46 for replaceably receiving foot of associated leg 42 of user 38
72 inner wall of lower tibia portion 66 of each leg of pair of legs 60 of leg assembly 46
73 heel of foot 68 of each leg of pair of legs 60 of leg assembly 46
74 slide bar of each leg of pair of legs 60 of leg assembly 46
75 strap of foot 68 of each leg of pair of legs 60 of leg assembly 46 for replaceably maintaining foot of associated leg 42 of user 38 to base 71 of foot 68 of associated leg 60 of leg assembly 46
76 front wall of lower tibia portion 66 of each leg of pair of legs 60 of leg assembly 46
77 rear of base 71 of foot 68 of each leg of pair of legs 60 of leg assembly 46
78 rear wall of lower tibia portion 66 of each leg of pair of legs 60 of leg assembly 46
80 outer wall of lower tibia portion 66 of each leg of pair of legs 60 of leg assembly 46
82 plurality of slots through inner wall 72 of lower tibia portion 66 of each leg of pair of legs 60 of leg assembly 46
84 plurality of roller pins of each leg of pair of legs 60 of leg assembly 46
86 bottom of slide bar 74 of each leg of pair of legs 60 of leg assembly 46
88 top of slide bar 74 of each leg of pair of legs 60 of leg assembly 46
90 ankle spring of each leg of pair of legs 60 of leg assembly 46
92 knee spring of each leg of pair of legs 60 of leg assembly 46
94 plurality of apertures in rear wall 78 of lower tibia portion 66 of each leg of pair of legs 60 of leg assembly 46
96 bolt of each hip joint of pair of hip joints 62 of leg assembly 46
98 nut of each hip joint of pair of hip joints 62 of leg assembly 46
100 spring catch assembly of each leg of pair of legs 60 of leg assembly 46
E. Specific Configuration of Spring Catch Assembly 100 of Each Leg of Pair of Legs 60 of Leg Assembly 46.
102 patella spring catch of spring catch assembly 100 of each leg of pair of legs 60 of leg assembly 46
104 head of patella spring catch 102 of spring catch assembly 100 of each leg of pair of legs 60 of leg assembly 46

106 springy body of patella spring catch 102 of spring catch assembly 100 of each leg of pair of legs 60 of leg assembly 46

108 beveled face of head 104 of patella spring catch 102 of spring catch assembly 100 of each leg of pair of legs 60 of leg assembly 46

109 notch in beveled face 108 of head 104 of patella spring catch 102 of spring catch assembly 100 of each leg of pair of legs 60 of leg assembly 46

110 inner portion of head 104 of patella spring catch 102 of spring catch assembly 100 of each leg of pair of legs 60 of leg assembly 46

112 protective cover of spring catch assembly 100 of each leg of pair of legs 60 of leg assembly 46

F. Specific Configuration of Alternate Embodiment of Spring Catch Assembly 114 of Each Leg 60 of Leg Assembly 46.

114 spring catch assembly of each leg of pair of legs 60 of leg assembly 46

116 plurality of apertures in rear wall 78 of lower tibia portion 66 of each leg of pair of legs 60 of leg assembly 46

118 plurality of corner apertures in lower tibia portion 66 of each leg of pair of legs 60 of leg assembly 46

5. DETAILED DESCRIPTION OF THE PREFERRED EMBODIMENTS

A. General.

Referring now to the figures, in which like numerals indicate like parts, and particularly to FIG. 1, which is a diagrammatic perspective view of the arrangement of the embodiments of the present invention replaceably supporting a backpack having a load on the back of a user and transferring the load of the backpack to the ground by way of the legs of the user while allowing the user to take steps unhindered, the arrangement of the embodiments of the present invention is shown generally at 30 for replaceably supporting a backpack 32 having a load 34 on the back 36 of a user 38 and transferring the load 34 of the backpack 32 to the ground 40 by way of the legs 42 of the user 38 while allowing the user 38 to take steps unhindered.

B. Overall Configuration of the Arrangement 30.

The overall configuration of the arrangement 30 can best be seen in FIG. 2, which is an enlarged diagrammatic perspective view of the arrangement of the embodiments of the present invention identified by ARROW 2 in FIG. 1, and as such, will be discussed with reference thereto.

The arrangement 30 comprises a harness 44 and a leg assembly 46. The harness 44 is for replaceably supporting the backpack 32 having the load 34 on the back 36 of the user 38. The leg assembly 46 is pivotally mounted to the harness 44, is for extending down the legs 42 of the user 38, and is for transferring the load 34 of the backpack 32 to the ground 40 by way of the legs 42 of the user 38 while allowing the user 38 to take the steps unhindered (FIG. 1).

C. Specific Configuration of the Harness 44.

The specific configuration of the harness 44 can best be seen in FIG. 2, which is again an enlarged diagrammatic perspective view of the arrangement of the embodiments of the present invention identified by ARROW 2 in FIG. 1, and as such, will be discussed with reference thereto.

The harness 44 comprises a lap belt 48 and a pair of shoulder straps 50. The lap belt 48 of the harness 44 is for replaceably encircling the abdomen of the user 38. The pair of shoulder straps 50 of the harness 44 are affixed to the lap belt 48 of the harness 44, and are for replaceably engaging the shoulders of the user 38.

The harness 44 further comprises a shelf 52. The shelf 52 of the harness 44 extends rearwardly from the lap belt 48 of the harness 44, and is for supporting the backpack 32 having the load 34 thereof.

The shelf 52 of the harness 44 is generally L-shaped, and as such, has an upright portion 54 and a transverse portion 56. The upright portion 54 of the shelf 52 of the harness 44 extends along the lap belt 48 of the harness 44, at the back of the user 38, and is engaged by the pair of shoulder straps 50 of the harness 44. The transverse portion 56 of the shelf 52 of the harness 44 extends rearwardly from the upright portion 54 of the shelf 52 of the harness 44, is for supporting the backpack 32 and the load 34 thereof, and has a pair of ends 57.

The harness 44 further comprises a pair of pelvic bars 58. The pair of pelvic bars 58 of the harness 44 are affixed to, and depend downwardly and outwardly from, the pair of ends 57 of the transverse portion 56 of the shelf 52 of the harness 44, respectively.

D. Specific Configuration of the Leg Assembly 46.

The specific configuration of the leg assembly 46 can best be seen in FIGS. 2-4, and 8, which are, respectively, again an enlarged diagrammatic perspective view of the arrangement of the embodiments of the present invention identified by ARROW 2 in FIG. 1, an enlarged exploded diagrammatic perspective view of the area generally enclosed by the dotted curve identified by ARROW 3 in FIG. 2 of a portion of a leg of a leg assembly of the arrangement of the embodiments of the present invention; an enlarged exploded diagrammatic perspective view of the area generally enclosed by the dotted curve identified by ARROW 4 in FIG. 2 of a hip joint of the leg of the leg assembly of the arrangement of the embodiments of the present invention, and an enlarged diagrammatic cross sectional view taken along LINE 8-8 in FIG. 2 of a slot slide bar interacting with a lower leg of the leg of the leg assembly when the spring catch of the knee of the leg of the leg assembly of the arrangement of the embodiments of the present invention is latched, and as such, will be discussed with reference thereto.

The leg assembly 46 comprises a pair of legs 60. The pair of legs 60 of the leg assembly 46 depend from, and are pivotally mounted to, the pair of pelvic bars 58 of the harness 44, respectively, so as to form a pair of hip joints 62, and are for running along the buttocks of the user 38, respectively.

Each leg 60 of the leg assembly 46 comprises an upper femur portion 64 and a lower tibia portion 66. The upper femur portion 64 of each leg 60 of the leg assembly 46 is for running along the back of the femur of an associated leg 42 of the user 38. The lower tibia portion 66 of each leg 60 of the leg assembly 46 depends from, and is telescopically received in, the femur portion 64 of an associated leg 60 of the leg assembly 44 so as to allow for different length legs 42 of the user 38 and for allowing bending of the knees of the user 38 when taking a step, and is for running along the back of the tibia of an associated leg 42 of the user 38.

Each leg 60 of the leg assembly 46 further comprises a foot 68. The foot 68 of each leg 60 of the leg assembly 46 is slidably mounted to the lower tibia portion 66 of an associated leg 60 of the leg assembly 46 so as to form an ankle joint 70, and is for capturing the foot of an associated leg 42 of the user 38.

The foot 68 of each leg 60 of the leg assembly 46 comprises a base 71, a heel 73, and a strap 75. The base 71 of the foot 68 of each leg 60 of the leg assembly 46 has a rear 77, and is for replaceably receiving the foot of an associated leg 42 of the user 38. The heel 73 of the foot 68 of each leg 60 of the leg assembly 46 is a tube fixedly attached to the rear 77 of the base 71 of the foot 68 of an associated leg 60 of the leg assembly 46, and slidably receives the lower tibia portion 66 of an associated leg 60 of the leg assembly 46 therein, with the ankle spring 90 of the associated leg 60 of the leg assembly 46 bearing against the heel 73 of the foot 68 of the associated leg 60 of the leg assembly 46 and biasing against the slide bar 74 of the associated leg 60 of the leg assembly 46. The strap 75 of the foot 68 of each leg 60 of the leg assembly 46 extends from the heel 73 of the foot 68 of an associated leg 60 of the leg assembly 46, and is for replaceably maintaining the foot of the associated leg 42 of the user 38 to the base 71 of the foot 68 of the associated leg 60 of the leg assembly 46.

The lower tibia portion 66 of each leg 60 of the leg assembly 46 has an inner wall 72. Each leg 60 of the leg assembly 46 further comprises a slide bar 74. The slide bar 74 of each leg 60 of the leg assembly 46 moves rearwardly downwardly and forwardly upwardly along the inner wall 72 of the lower tibia portion 66 of an associated leg 60 of the leg assembly 46.

The slide bar 74 of each leg 60 of the leg assembly 46 is flat, thin, and elongated.

The lower tibia portion 66 of each leg 60 of the leg assembly 46 further has a front wall 76, a rear wall 78, and an outer wall 80.

The inner wall 72 of the lower tibia portion 66 of each leg 60 of the leg assembly 46 has a plurality of slots 82 therethrough. The plurality of slots 82 through the inner wall 72 of the lower tibia portion 66 of each leg 60 of the leg assembly 46 are vertically spaced-apart from each other, are parallel to each other, and are diagonally slanted upwardly from the rear wall 78 of the lower tibia portion 66 of an associated leg 60 of the leg assembly 46 to the front wall 26 of the lower tibia portion 66 of the associated leg 60 of the leg assembly 46.

Each leg 60 of the leg assembly 46 further comprises a plurality of roller pins 84. The plurality of roller pins 84 of each leg 60 of the leg assembly 46 extend freely outwardly through the plurality of slots 82 in the inner wall 72 of the lower tibia portion 66 of an associated leg 60 of the leg assembly 46, respectively, so as to be able to move relative thereto, and are fixed to the slide bar 74 of the associated leg 60 of the leg assembly 46 so as to allow the slide bar 74 of each leg 60 of the leg assembly 46 to slide diagonally, i.e., rearwardly downwardly and forwardly upwardly relative to the lower tibia portion 66 of the associated leg 60 of the leg assembly 46.

The slide bar 74 of each leg 60 of the leg assembly 46 has a bottom 86 and a top 88. Each leg 60 of the leg assembly 46 further comprises an ankle spring 90. The ankle spring 90 of each leg 60 of the leg assembly 46 encircles the lower tibia portion 66 of an associated leg 60 of the leg assembly 46, seats against the foot 68 of the associated leg 60 of the leg assembly 46, and biases against the bottom 86 of the slide bar 74 of the associated leg 60 of the leg assembly 46.

Each leg 60 of the leg assembly 46 further comprises a knee spring 92. The knee spring 92 of each leg 60 of the leg assembly 46 extends into the lower tibia portion 66 of an associated leg 60 of the leg assembly 46, and biases downwards against the top 88 of the slide bar 74 of the associated leg 60 of the leg assembly 46 when the ankle spring 90 of the associated leg 60 of the leg assembly 46 is not biasing the slide bar 74 of the associated leg 60 of the leg assembly 46 upwards.

The rear wall 78 of the lower tibia portion 66 of each leg 60 of the leg assembly 46 has a plurality of apertures 94 therethrough.

Figure 4:
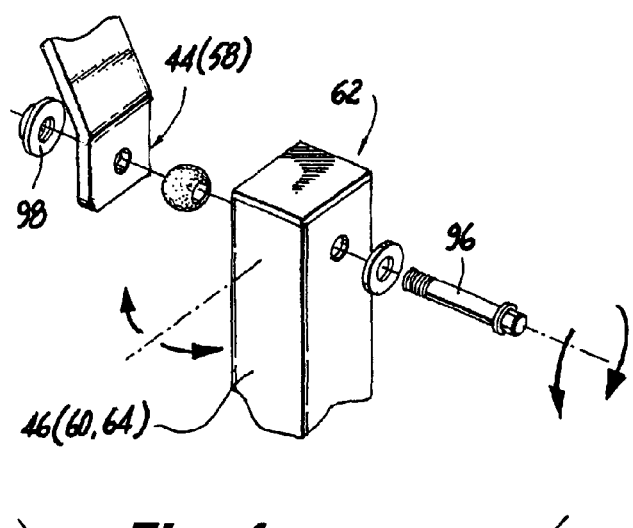
FIG. 4 is an enlarged exploded diagrammatic perspective view of the area generally enclosed by the dotted curve identified by ARROW 4 in FIG. 2 of a hip joint of the leg of the leg assembly of the arrangement of the embodiments of the present invention.
Figure 3:
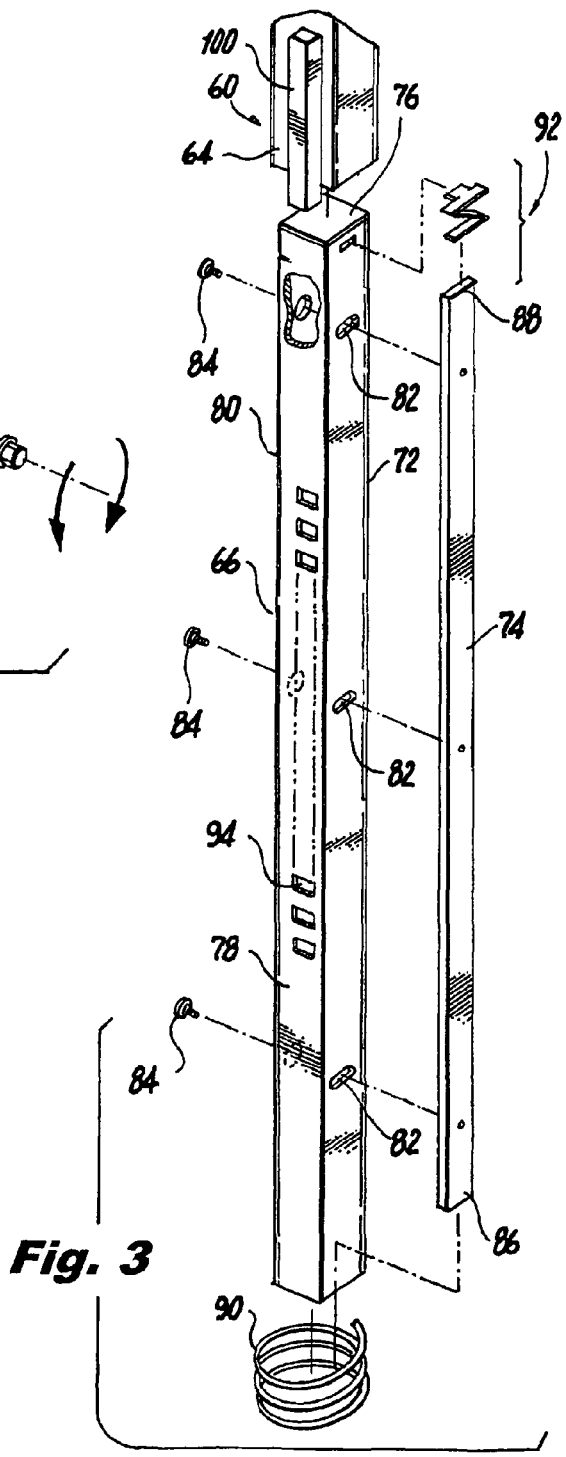
FIG. 3 is an enlarged exploded diagrammatic perspective view of the area generally enclosed by the dotted curve identified by ARROW 3 in FIG. 2 of a portion of a leg of a leg assembly of the arrangement of the embodiments of the present invention.

As shown in FIG. 4, each hip joint 62 comprises a bolt 96. The bolt 96 of each hip joint 62 passes freely through the upper femur portion 64 of an associated leg 60 of the leg assembly 46, through an associated pelvic bar 58 of the harness 44, and threadably into a nut 98 so as to allow the pair of legs 60 of the leg assembly 46 to pivot relative to the harness 44.

Each leg 60 of the leg assembly 46 further comprises a spring catch assembly 100. The spring catch assembly 100 of each leg 60 of the leg assembly 46 selectively locks and unlocks the lower tibia portion 66 of an associated leg 60 of the leg assembly 46 relative to the upper femur portion 64 of the associated leg 60 of the leg assembly 46, depending upon position of the foot 68 of the associated leg 60 of the leg assembly 46.

E. Specific Configuration of the Spring Catch Assembly 100 of Each Leg 60 of the Leg Assembly 46.

Figure 5:
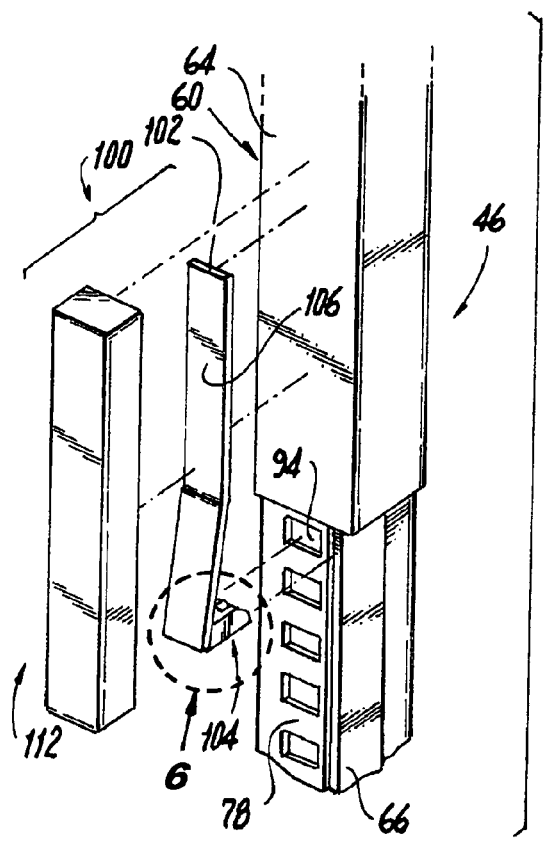
FIG. 5 is an enlarged exploded diagrammatic perspective view of the area generally enclosed by the dotted curve identified by ARROW 5 in FIG. 2 of a first embodiment of a spring catch of a knee of the leg of the leg assembly of the arrangement of the embodiments of the present invention.
Figure 7:
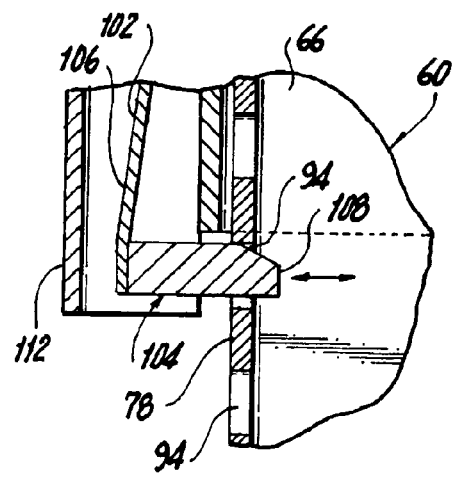
FIG. 7 is an enlarged diagrammatic cross sectional view taken along LINE 7-7 in FIG. 2 of the first embodiment of the spring catch of the knee of the leg of the leg assembly of the arrangement of the embodiments of the present invention latched.
Figure 6:
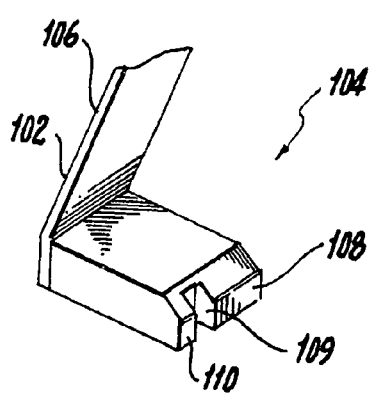
FIG. 6 is an enlarged diagrammatic perspective view of the area generally enclosed by the dotted curve identified by ARROW 6 in FIG. 5 of a face of the first embodiment of the spring catch of the knee of the leg of the leg assembly of the arrangement of the embodiments of the present invention.
Figure 8:
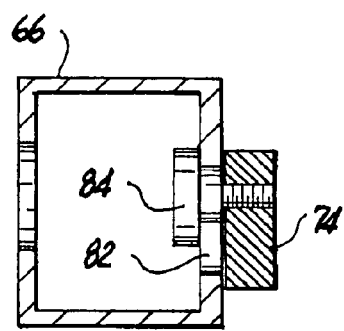
FIG. 8 is an enlarged diagrammatic cross sectional view taken along LINE 8-8 in FIG. 2 of a slot slide bar interacting with a lower leg of the leg of the leg assembly when the spring catch of the knee of the leg of the leg assembly of the arrangement of the embodiments of the present invention is latched.

The specific configuration of the spring catch assembly 100 of each leg 60 of the leg assembly 46 can best be seen in FIGS. 5-7, which are, respectively, an enlarged exploded diagrammatic perspective view of the area generally enclosed by the dotted curve identified by ARROW 5 in FIG. 2 of a first embodiment of a spring catch of a knee of the leg of the leg assembly of the arrangement of the embodiments of the present invention, an enlarged diagrammatic perspective view of the area generally enclosed by the dotted curve identified by ARROW 6 in FIG. 5 of a face of the first embodiment of the spring catch of the knee of the leg of the leg assembly of the arrangement of the embodiments of the present invention, and an enlarged diagrammatic cross sectional view taken along LINE 7-7 in FIG. 2 of the first embodiment of the spring catch of the knee of the leg of the leg assembly of the arrangement of the embodiments of the present invention latched, and as such, will be discussed with reference thereto.

The spring catch assembly 100 of each leg 60 of the leg assembly 46 comprises a patella spring catch 102. The patella spring catch 102 of the spring catch assembly 100 of each leg 60 of the leg assembly 46 has a head 104 and a springy body 106.

The springy body 106 of the patella spring catch 102 of the spring catch assembly 100 of each leg 60 of the leg assembly 46 depends fixedly from the upper femur portion 64 of an associated leg 60 of the leg assembly 46, outwardly to the head 104 of the patella spring catch 102 of the spring catch assembly 100 of the associated leg 60 of the leg assembly 46 so as to allow the head 104 of the patella spring catch 102 of the spring catch assembly 100 of the associated leg 60 of the leg assembly 46 to normally be spring biased into a selected aperture 94 in the rear wall 78 of the lower tibia portion 66 of the associated leg 60 of the leg assembly 46, thereby locking the lower tibia portion 66 of the associated leg 60 of the leg assembly 46 in the upper femur portion 64 of the associated leg 60 of the leg assembly 46.

The head 104 of the patella spring catch 102 of the spring catch assembly 100 of each leg 60 of the leg assembly 46 has a beveled face 108. The beveled face 108 of the head 104 of the patella spring catch 102 of the spring catch assembly 100 of each leg 60 of the leg assembly 46 facilitates insertion of the head 104 of the patella spring catch 102 of the spring catch assembly 100 of an associated leg 60 of the leg assembly 46 into the selected aperture 94 in the rear wall 78 of the lower tibia portion 66 of the associated leg 60 of the leg assembly 46.

The beveled face 108 of the head 104 of the patella spring catch 102 of the spring catch assembly 100 of each leg 60 of the leg assembly 46 has a notch 109. The notch 109 in the beveled face 108 of the head 104 of the patella spring catch 102 of the spring catch assembly 100 of each leg 60 of the leg assembly 46 allows an inner portion 110 of the head 104 of the patella spring catch 102 of the spring catch assembly 100 of an associated leg 60 of the leg assembly 46 to be engaged by the slide bar 74 of the associated leg 60 of the leg assembly 46 to disengage the head 104 of the patella spring catch 102 of the spring catch assembly 100 of the associated leg 60 of the leg assembly 46 from the selected aperture 94 in the rear wall 78 of the lower tibia portion 66 of the associated leg 60 of the leg assembly 46.

The spring catch assembly 100 of each leg 60 of the leg assembly 46 further comprises a protective cover 112. The protective cover 112 of the spring catch assembly 100 of each leg 60 of the leg assembly 46 covers and protects the patella spring catch 102 of the spring catch assembly 100 of an associated leg 60 of the leg assembly 46.

F. Specific Configuration of an Alternate Embodiment of the Spring Catch Assembly 114 of Each Leg 60 of the Leg Assembly 46.

The specific configuration of an alternate embodiment of the spring catch assembly 114 of each leg 60 of the leg assembly 46 can best be seen in FIGS. 21-23, which are, respectively, an enlarged diagrammatic perspective view of the area generally enclosed by the dotted curve identified by ARROW 21 in FIG. 2 of a second embodiment of the spring catch of the knee of the leg of the leg assembly of the arrangement of the embodiments of the present invention, an enlarged diagrammatic cross sectional view taken along LINE 22-22 in FIG. 21 of the second embodiment of the spring catch of the knee of the leg of the leg assembly of the arrangement of the embodiments of the present invention latched, and an enlarged diagrammatic cross sectional view taken along LINE 23-23 in FIG. 21 of the second embodiment of the spring catch of the knee of the leg of the leg assembly of the arrangement of the embodiments of the present invention unlatched, and as such, will be discussed with referenced thereto.

The spring catch assembly 114 of each leg 60 of the leg assembly 46 is similar to the spring catch assembly 110 of each leg 60 of the leg assembly 46, except: that the plurality of apertures 116 in the rear wall 78 of the lower tibia portion 66 of each leg 60 of the leg assembly 46 wrap around into the inner wall 72 of the lower tibia portion 66 of an associated leg 60 of the leg assembly 46 so as to form a plurality of corner apertures 118 that eliminate a need for the notch 109 in the beveled face 108 of the head 104 of the patella spring catch 102 of the spring catch assembly 100 of each leg 60 of the leg assembly 46.

G. Method of Operation of the Arrangement 30.

Figure 9:
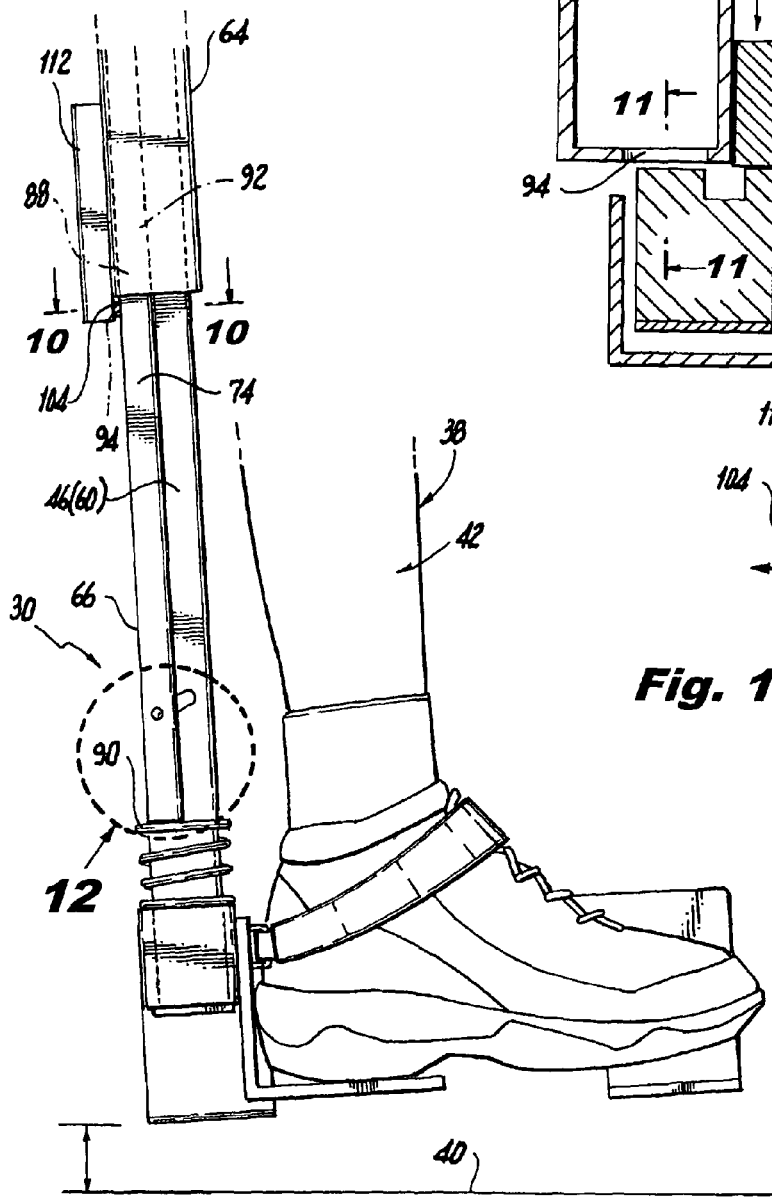
FIG. 9 is an enlarged diagrammatic side elevational view of the leg of the leg assembly identified by ARROW 9 in FIG. 1 wherein the spring catch of the knee of the leg of the leg assembly of the arrangement of the embodiments of the present invention is unlatched.
Figure 10:
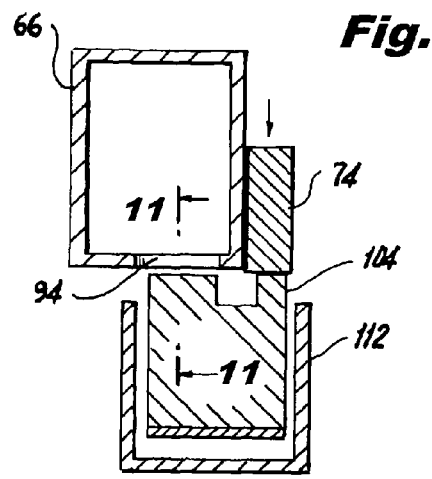
FIG. 10 is an enlarged diagrammatic cross sectional view taken along LINE 10-10 in FIG. 9 of the spring catch of the knee of the leg of the leg assembly of the arrangement of the embodiments of the present invention being unlatched.
Figure 11:
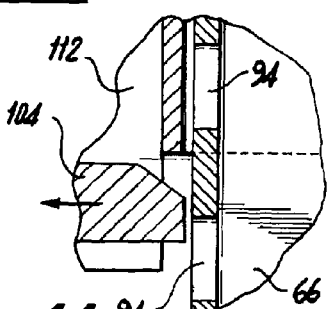
FIG. 11 is a diagrammatic cross sectional view taken along LINE 11-11 in FIG. 10 of the spring catch of the knee of the leg of the leg assembly of the arrangement of the embodiments of the present invention is unlatched.
Figure 12:
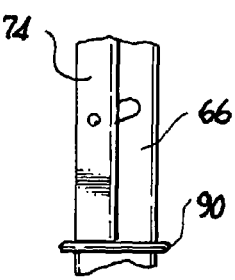
FIG. 12 is a diagrammatic side elevational view of the area generally enclosed by the dotted curve identified by ARROW 12 in FIG. 9 of an ankle spring fully extended against the slot slide bar.

The method of operation of the arrangement 30 can best be seen in FIGS. 9-20, which are, respectively, an enlarged diagrammatic side elevational view of the leg of the leg assembly identified by ARROW 9 in FIG. 1 wherein the spring catch of the knee of the leg of the leg assembly of the arrangement of the embodiments of the present invention is unlatched, an enlarged diagrammatic cross sectional view taken along LINE 10-10 in FIG. 9 of the spring catch of the knee of the leg of the leg assembly of the arrangement of the embodiments of the present invention being unlatched, a diagrammatic cross sectional view taken along LINE 11-11 in FIG. 10 of the spring catch of the knee of the leg of the leg assembly of the arrangement of the embodiments of the present invention is unlatched, a diagrammatic side elevational view of the area generally enclosed by the dotted curve identified by ARROW 12 in FIG. 9 of an ankle spring fully extended against the slot slide bar; an enlarged diagrammatic side elevational view of the leg of the leg assembly identified by ARROW 13 in FIG. 1 wherein the spring catch of the knee of the leg of the leg assembly of the arrangement of the embodiments of the present invention is latched, an enlarged diagrammatic cross sectional view taken along LINE 14-14 in FIG. 13 of the spring catch of the knee of the leg of the leg assembly of the arrangement of the embodiments of the present invention latched, a diagrammatic cross sectional view taken along LINE 15-15 in FIG. 14 of the spring catch of the knee of the leg of the leg assembly of the arrangement of the embodiments of the present invention latched, a diagrammatic side elevational view of the area generally enclosed by the dotted curve identified by ARROW 16 in FIG. 13 of the ankle spring fully compressed against the slot slide bar, an enlarged diagrammatic side elevational view of the leg of the leg assembly identified by ARROW 17 in FIG. 1 wherein the spring catch of the knee of the leg of the leg assembly of the arrangement of the embodiments of the present invention is in the process of being unlatched, an enlarged diagrammatic cross sectional view taken along LINE 18-18 in FIG. 17 of the spring catch of the knee of the leg of the leg assembly of the arrangement of the embodiments of the present invention being unlatched, a diagrammatic cross sectional view taken along LINE 19-19 in FIG. 18 of the spring catch of the knee of the leg of the leg assembly of the arrangement of the embodiments of the present invention being unlatched, and a diagrammatic side elevational view of the area generally enclosed by the dotted curve identified by ARROW 20 in FIG. 17 of the ankle spring being extended against the slot slide bar, and as such, will be discussed with reference thereto.

As shown in FIGS. 9-12, the arrangement 30 is in an unlatched mode. This mode allows for initial length adjustment of each leg 60 of the leg assembly 46 for the leg 42 of the user 38, and occurs when the user 38 takes a step and lifts the foot of the user 38 completely off the ground 40.

In this unlatched mode, the ankle spring 90 of an associated leg 60 of the leg assembly 46 is relaxed and is thereby not biasing the slide bar 74 of the associated leg 60 of the leg assembly 46 upwards to thereby cause the knee spring 92 of the associated leg 60 of the leg assembly 46 to bias downwards against the top 88 of the slide bar 74 of the associated leg 60 of the leg assembly 46 causing the slide bar 74 of the associated leg 60 of the leg assembly 46 to move downwardly and rearwardly, and as such, pushes the head 104 of the patella spring catch 102 of the spring catch assembly 100 of the associated leg 60 of the leg assembly 46 rearwardly out of a selected aperture 94 in the rear wall 78 of the lower tibia portion 66 of the associated leg 60 of the leg assembly 46, thereby unlocking the lower tibia portion 66 of the associated leg 60 of the leg assembly 46 from the upper femur portion 64 of the associated leg 60 of the leg assembly 46.

As shown in FIGS. 13-16, the arrangement 30 is in a latched mode. This mode allows for transferring the load 34 of the backpack 32 to the ground 40 by way of the legs 42 of the user 38 while allowing the user 38 to take steps unhindered.

In this latched mode, the ankle spring 90 of an associated leg 60 of the leg assembly 46 biases the slide bar 74 of the associated leg 60 of the leg assembly 46 upwards to thereby cause the slide bar 74 of the associated leg 60 of the leg assembly 46 to move upwardly and forwardly, and as such, releases the head 104 of the patella spring catch 102 of the spring catch assembly 100 of the associated leg 60 of the leg assembly 46 from engagement in the selected aperture 94 in the rear wall 78 of the lower tibia portion 66 of the associated leg 60 of the leg assembly 46, thereby locking the lower tibia portion 66 of the associated leg 60 of the leg assembly 46 in the upper femur portion 64 of the associated leg 60 of the leg assembly 46.

As shown in FIGS. 17-20, the arrangement 30 is in the process of leaving the latched mode.

The knee spring 92 of an associated leg 60 of the leg assembly 46 begins to bias the slide bar 74 of the associated leg 60 of the leg assembly 46 downwards to thereby cause the slide bar 74 of the associated leg 60 of the leg assembly 46 to begin to move downwardly and rearwardly, and as such, begins to push the head 104 of the patella spring catch 102 of the spring catch assembly 100 of the associated leg 60 of the leg assembly 46 out of engagement in the selected aperture 94 in the rear wall 78 of the lower tibia portion 66 of the associated leg 60 of the leg assembly 46, thereby beginning to unlock the lower tibia portion 66 of the associated leg 60 of the leg assembly 46 from the upper femur portion 64 of the associated leg 60 of the leg assembly 46.

H. Impressions.

It will be understood that each of the elements described above or two or more together may also find a useful application in other types of constructions differing from the types described above.

While the embodiments of the present invention have been illustrated and described as embodied in an arrangement for replaceably supporting a backpack having a load on the back of a user and transferring the load of the backpack to the ground by way of the legs of the user while allowing the user to take steps unhindered, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. An arrangement for replaceably supporting a backpack having a load on the back of a user and transferring the load of the backpack to the ground by way of the legs of the user while allowing the user to take steps unhindered, comprising:
   a) a harness;
   b) a leg assembly;
   wherein said harness is for replaceably supporting the backpack having the load on the back of the user;
   wherein said leg assembly is pivotally mounted to said harness;
   wherein said leg assembly is for extending down the legs of the user;
   wherein said leg assembly is for transferring the load of the backpack to the ground by way of the legs of the user while allowing the user to take steps unhindered, wherein said harness comprises:
   c) a lap belt;
   d) a pair of shoulder straps, wherein said harness comprises a shelf, wherein said shelf of said harness is generally L-shaped, and as such, has:
   e) an upright portion;
   f) a transverse portion, wherein said harness comprises a pair of pelvic bars, wherein said leg assembly comprises a pair of legs, wherein said pair of legs of said leg assembly depend from said pair of pelvic bars of said harness, respectively;
   wherein said pair of legs of said leg assembly are pivotally mounted to said pair of pelvic bars of said harness, respectively, so as to form a pair of hip joints; and
   wherein said pair of hip joints are for running along the buttocks of the user, respectively, wherein each leg of said leg assembly comprises:
   g) an upper femur portion;
   h) a lower tibia portion, wherein each leg of said leg assembly comprises a foot, wherein said lower tibia portion of each leg of said leg assembly has an inner wall;
   wherein each leg of said leg assembly comprises a slide bar;
   wherein said slide bar of each leg of said leg assembly moves rearwardly downwardly and forwardly upwardly along said inner wall of said lower tibia portion of an associated leg of said leg assembly;
   wherein said lower tibia portion of each leg of said leg assembly has:
   i) a front wall;
   j) a rear wall; and
   k) an outer wall;
   wherein said inner wall of said lower tibia portion of each leg of said leg assembly has a plurality of slots therethrough;
   wherein said plurality of slots through said inner wall of said lower tibia portion of each leg of said leg assembly are vertically spaced-apart from each other;
   wherein said plurality of slots through said inner wall of said lower tibia portion of each leg of said leg assembly are parallel to each other; and
   wherein said plurality of slots through said inner wall of said lower tibia portion of each leg of said leg assembly are diagonally slanted upwardly from said rear wall of said lower tibia portion of an associated leg of said leg assembly to said front wall of said lower tibia portion of said associated leg of said leg assembly.

2. The arrangement of claim 1, wherein each leg of said leg assembly comprises an ankle spring.

3. The arrangement of claim 2, wherein each leg of said leg assembly comprises a knee spring.

4. The arrangement of claim 3, wherein said slide bar of each leg of said leg assembly has a top;
   wherein said knee spring of each leg of said leg assembly extends into said lower tibia portion of an associated leg of said leg assembly; and
   wherein said knee spring of each leg of said leg assembly biases downwards against said top of said slide bar of said associated leg of said leg assembly when said ankle spring of said associated leg of said leg assembly is not biasing said slide bar of said associated leg of said leg assembly upwards.

5. The arrangement of claim 4, wherein said rear wall of said lower tibia portion of each leg of said leg assembly has a plurality of apertures therethrough.

6. The arrangement of claim 5, wherein each leg of said leg assembly comprises a spring catch assembly.

7. The arrangement of claim 6, wherein said spring catch assembly of each leg of said leg assembly comprises a patella spring catch.

8. The arrangement of claim 7, wherein said patella spring catch of said spring catch assembly of each leg of said leg assembly has:
   a) a head; and
   b) a springy body.

9. The arrangement of claim 8, wherein said springy body of said patella spring catch of said spring catch assembly of each leg of said leg assembly depends fixedly from said upper femur portion of an associated leg of said leg assembly, outwardly to said head of said patella spring catch of said spring catch assembly of said associated leg of said leg assembly so as to allow said head of said patella spring catch of said spring catch assembly of said associated leg of said leg assembly to normally be spring biased into a selected aperture in said rear wall of said lower tibia portion of said associated leg of said leg assembly thereby locking said lower tibia portion of said associated leg of said leg assembly in said upper femur portion of said associated leg of said leg assembly.

10. The arrangement of claim 9, wherein said head of said patella spring catch of said spring catch assembly of each leg of said leg assembly has a beveled face; and wherein said beveled face of said head of said patella spring catch of said spring catch assembly of each leg of said leg assembly facilitates insertion of said head of said patella spring catch of said spring catch assembly of said associated leg of said leg assembly into said selected aperture in said rear wall of said lower tibia portion of said associated leg of said leg assembly.

11. The arrangement of claim 10, wherein said beveled face of said head of said patella spring catch of said spring catch assembly of each leg of said leg assembly has a notch.

12. The arrangement of claim 11, wherein said notch in said beveled face of said head of said patella spring catch of said spring catch assembly of each leg of said leg assembly allows an inner portion of said head of said patella spring catch of said spring catch assembly of an associated leg of said leg assembly to be engaged by said slide bar of said associated leg of said leg assembly to disengage said head of said patella spring catch of said spring catch assembly of an associated leg of said leg assembly from said selected aperture in said rear wall of said lower tibia portion of said associated leg of said leg assembly.

13. The arrangement of claim 10, wherein said plurality of apertures in said rear wall of said lower tibia portion of each leg of said leg assembly wrap around into said inner wall of said lower tibia portion of an associated leg of said leg assembly so as to form a plurality of corner apertures.

14. The arrangement of claim 8, wherein said leg assembly has an unlatched mode; and
wherein said unlatched mode of said leg assembly allows for initial length adjustment of each leg of the leg assembly for the leg of the user, and occurs when the user takes a step and lifts the foot of the user completely off the ground.

15. The arrangement of claim 14, wherein in said unlatched mode, said ankle spring of an associated leg of said leg assembly is relaxed and is thereby not biasing said slide bar of said associated leg of said leg assembly upwards to thereby cause said knee spring of said associated leg of said leg assembly to bias downwards against said top of said slide bar of said associated leg of said leg assembly causing said slide bar of said associated leg of said leg assembly to move downwardly and rearwardly, and as such, pushes said head of said patella spring catch of said spring catch assembly of said associated leg of said leg assembly rearwardly out of a selected aperture in said rear wall of said lower tibia portion of said associated leg of said leg assembly, thereby unlocking said lower tibia portion of said associated leg of said leg assembly from said upper femur portion of said associated leg of said leg assembly.

16. The arrangement of claim 8, wherein said arrangement has a latched mode; and
wherein said unlatched mode of said arrangement allows for transferring the load of the backpack to the ground by way of the legs of the user while allowing the user to take the steps unhindered.

17. The arrangement of claim 16, wherein in said latched mode, said ankle spring of an associated leg of said leg assembly biases said slide bar of said associated leg of said leg assembly upwards to thereby cause said slide bar of said associated leg of said leg assembly to move upwardly and forwardly, and as such, releases said head of said patella spring catch of said spring catch assembly of said associated leg of said leg assembly from engagement in a selected aperture in said rear wall of said lower tibia portion of said associated leg of said leg assembly, thereby locking said lower tibia portion of said associated leg of said leg assembly in said upper femur portion of said associated leg of said leg assembly.

18. The arrangement of claim 7, wherein said spring catch assembly of each leg of said leg assembly comprises a protective cover.

19. The arrangement of claim 18, wherein said protective cover of said spring catch assembly of each leg of said leg assembly covers and protects said patella spring catch of said spring catch assembly of an associated leg of said leg assembly.

20. The arrangement of claim 6, wherein said spring catch assembly of each leg of said leg assembly selectively locks and unlocks said lower tibia portion of an associated leg of said leg assembly relative to said upper femur portion of said associated leg of said leg assembly, depending upon position of said foot of said associated leg of said leg assembly.

21. The arrangement of claim 2, wherein said slide bar of each leg of said leg assembly has a bottom;
wherein said ankle spring of each leg of said leg assembly encircles said lower tibia portion of an associated leg of said leg assembly;
wherein said ankle spring of each leg of said leg assembly seats against said foot of said associated leg of said leg assembly; and
wherein said ankle spring of each leg of said leg assembly biases against said bottom of said slide bar of said associated leg of said leg assembly.

22. The arrangement of claim 2, wherein said foot of each leg of said leg assembly comprises:
a) a base;
b) a heel; and
c) a strap.

23. The arrangement of claim 22, wherein said base of said foot of each leg of said leg assembly is for replaceably receiving the foot of an associated leg of the user;
wherein said base of said foot of each leg of said leg assembly has a rear;
wherein said heel of said foot of each leg of said leg assembly is a tube fixedly attached to said rear of said base of said foot of an associated leg of said leg assembly;
wherein said heel of said foot of each leg of said leg assembly slidably receives said lower tibia portion of an associated leg of said leg assembly, with said ankle spring of said associated leg of said leg assembly bearing against said heel of said foot of said associated leg of said leg assembly and biasing against said slide bar of said associated leg of said leg assembly;
wherein said strap of said foot of each leg of said leg assembly extends from said heel of said foot of an associated leg of said leg assembly; and
wherein said strap of said foot of each leg of said leg assembly is for replaceably maintaining the foot of the associated leg of the user to said base of said foot of said associated leg of said leg assembly.

24. The arrangement of claim 1, wherein each leg of said leg assembly comprises a plurality of roller pins.

25. The arrangement of claim 24, wherein said plurality of roller pins of each leg of said leg assembly extend freely outwardly through said plurality of slots in said inner wall of said lower tibia portion of an associated leg of said leg assembly, respectively, so as to be able to move relative thereto, and are fixed to said slide bar of said associated leg of said leg assembly so as to allow said slide bar of each leg of said leg assembly to slide diagonally, rearwardly downwardly and forwardly upwardly, relative to said lower tibia portion of said associated leg of said leg assembly.

26. The arrangement of claim 1, wherein said lap belt of said harness is for replaceably encircling the abdomen of the user;
   wherein said pair of shoulder straps of said harness are affixed to said lap belt of said harness; and
   wherein said pair of shoulder straps of said harness are for replaceably engaging the shoulders of the user.

27. The arrangement of claim 1, wherein said shelf of said harness extends rearwardly from said lap belt of said harness; and
   wherein said shelf of said harness is for supporting the backpack having the load thereof.

28. The arrangement of claim 1, wherein said upright portion of said shelf of said harness extends along said lap belt of said harness, at the back of the user;
   wherein said upright portion of said shelf of said harness is engaged by said pair of shoulder straps of said harness;
   wherein said transverse portion of said shelf of said harness extends rearwardly from said upright portion of said shelf of said harness; and
   wherein said transverse portion of said shelf of said harness is for supporting the backpack and the load thereof.

29. The arrangement of claim 1, wherein said transverse portion of said shelf of said harness has a pair of ends;
   wherein said pair of pelvic bars of said harness are affixed to said pair of ends of said transverse portion of said shelf of said harness, respectively; and
   wherein said pair of pelvic bars of said harness depend downwardly and outwardly from said pair of ends of said transverse portion of said shelf of said harness, respectively.

30. The arrangement of claim 1, wherein said upper femur portion of each leg of said leg assembly is for running along the back of the femur of an associated leg of the user;
   wherein said lower tibia portion of each leg of said leg assembly depends from said femur portion of an associated leg of said leg assembly;
   wherein said lower tibia portion of each leg of said leg assembly is telescopically received in said femur portion of an associated leg of said leg assembly so as to allow for different length legs of the user and for allowing bending of the knees of the user when taking a step; and
   wherein said lower tibia portion of each leg of said leg assembly is for running along the back of the tibia of an associated leg of the user.

31. The arrangement of claim 1, wherein said foot of each leg of said leg assembly is slidably mounted to said lower tibia portion of an associated leg of said leg assembly so as to form an ankle joint; and
   wherein said foot of each leg of said leg assembly is for capturing the foot of an associated leg of the user.

32. The arrangement of claim 1, wherein said slide bar of each leg of said leg assembly is flat;
   wherein said slide bar of each leg of said leg assembly is thin; and
   wherein said slide bar of each leg of said leg assembly is elongated.

33. The arrangement of claim 1, wherein each hip joint comprises a bolt; and
   wherein said bolt of each hip joint passes freely through said upper femur portion of an associated leg of said leg assembly, through an associated pelvic bar of said harness, and threadably into a nut so as to allow said pair of legs of said leg assembly to pivot relative to said harness.

* * * * *